(12) United States Patent
Saito et al.

(10) Patent No.: US 10,350,987 B2
(45) Date of Patent: Jul. 16, 2019

(54) UPPER STRUCTURE OF VEHICLE ENGINE

(71) Applicant: MAZDA MOTOR CORPORATION, Hiroshima (JP)

(72) Inventors: Ken Saito, Higashihiroshima (JP); Yasuhiro Okasako, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 49 days.

(21) Appl. No.: 15/694,368

(22) Filed: Sep. 1, 2017

(65) Prior Publication Data

US 2018/0065473 A1    Mar. 8, 2018

(30) Foreign Application Priority Data

Sep. 7, 2016 (JP) .................................. 2016-174743

(51) Int. Cl.
| | | |
|---|---|---|
| *B60K 11/08* | (2006.01) | |
| *F02B 77/11* | (2006.01) | |
| *B60K 11/06* | (2006.01) | |
| *B60K 13/04* | (2006.01) | |

(52) U.S. Cl.
CPC .............. *B60K 11/08* (2013.01); *F02B 77/11* (2013.01); *B60K 11/06* (2013.01); *B60K 13/04* (2013.01)

(58) Field of Classification Search
CPC .................................. B60K 11/08; F02B 77/11
USPC ........................................................ 123/41.7
See application file for complete search history.

(56) References Cited

U.S. PATENT DOCUMENTS

| | | | | |
|---|---|---|---|---|
| 4,562,895 A | * | 1/1986 | Kirchweger ........... | B60K 11/08 123/198 E |
| 4,891,940 A | * | 1/1990 | Tamba ................... | B60K 11/00 123/41.49 |
| 2007/0261816 A1 | | 11/2007 | Warren et al. | |
| 2015/0252716 A1 | * | 9/2015 | Tanno ................... | B60K 13/04 123/41.58 |

FOREIGN PATENT DOCUMENTS

| | | |
|---|---|---|
| DE | 102010003635 A1 | 10/2011 |
| EP | 1759908 A1 | 3/2007 |
| JP | H11-348579 A | 12/1999 |
| JP | 2011-168083 A | 9/2001 |
| JP | 2003-201843 A | 7/2003 |
| JP | 2010-196643 A | 9/2010 |

* cited by examiner

*Primary Examiner* — Lindsay M Low
*Assistant Examiner* — Yi-Kai Wang
(74) *Attorney, Agent, or Firm* — Studebaker & Brackett PC

(57) ABSTRACT

In a rear exhaust engine, an upper portion of a rear portion of a head cover is provided with a first flow redirecting member facing upward and extending rearward and downward toward an exhaust device. A shield cover extending in a width direction of a vehicle is provided behind the first flow redirecting member. The shield cover has a shield surface extending from an upper end portion of the head cover toward a hood and directed rearward. The shield cover is designed such that its upper end is located below a rear end of the first flow redirecting member.

6 Claims, 12 Drawing Sheets

UPPER STRUCTURE OF VEHICLE ENGINE

CROSS-REFERENCE TO RELATED APPLICATION

This application claims priority to Japanese Patent Application No. 2016-174743 filed on Sep. 7, 2016, the entire disclosure of which is hereby incorporated by reference.

BACKGROUND

The present disclosure relates to an upper structure of a vehicle engine.

Japanese Unexamined Patent Publication No. H11-348579 describes an upper structure of a vehicle engine. This upper structure (an exhaust system cooling structure) is used in a so-called front intake and rear exhaust engine, and includes a design cover (an approach plate) provided over a head cover (a rocker cover). This design cover is arranged with a gap interposed between the design cover and the head cover, and has a lower surface having a rear end portion inclined toward an exhaust device (an exhaust passage). In the upper structure, an air stream produced by a traveling vehicle passes through the gap between the lower surface of the design cover and the upper surface of the head cover, and is guided to the exhaust device by the inclination of the lower surface of the design cover. Thus, the exhaust device can be effectively cooled.

For the upper structure described in Japanese Unexamined Patent Publication No. H11-348579 described above, when no air stream is produced by a traveling vehicle, such as when the vehicle is at rest, hot air rising from the exhaust device may flow into the gap between the design cover and the head cover.

An upper surface of a head cover is usually provided with parts, such as a harness. Thus, if the hot air flows into the gap as described above, such parts may be exposed to the hot air, resulting in inconvenience, such as erosion of such parts.

To address this inconvenience, the gap between the design cover and the head cover may be blocked to prevent hot air from flowing into the gap. However, such a configuration is not suitable for cooling the exhaust device with the air stream described above.

Such an unsuitable configuration is not limited to a configuration including a design cover, but is common to general configurations including various members arranged above the head cover.

In view of the foregoing background, one or more aspects of the present disclosure is directed to an upper structure of a vehicle engine that cools an exhaust device with an air stream produced by a traveling vehicle while protecting parts provided on an upper surface of an engine.

SUMMARY

According to an aspect of the present disclosure, an upper structure of a vehicle engine, including an engine body which is mounted in an engine compartment of a vehicle, and which includes a cylinder block, a cylinder head, and a head cover, and an exhaust device connected to the engine body, being closer to a rear end of the vehicle than the engine body is, and located below the head cover, includes: a flow redirecting member provided above a rear portion of the head cover, the flow redirecting member extending, below a hood that opens and closes the engine compartment, rearward and downward toward the exhaust device; and a shield cover located rearward of the flow redirecting member and extending in a width direction of the vehicle.

The shield cover has a shield surface extending upward from an upper portion of the head cover toward the hood and facing toward the rear end of the vehicle, and the shield cover is designed such that an upper end of the shield cover is located at the same height as that of a rear end of the flow redirecting member or below the rear end of the flow redirecting member.

Here, the flow redirecting member may be, for example, an upper surface of a rear end portion of a design cover.

According to this configuration, for example, while the vehicle is traveling, an air stream which is produced by the traveling vehicle and which has flowed into the engine compartment flows through the gap between the flow redirecting member disposed above the rear portion of the head cover and the hood, and is guided to the exhaust device by the flow redirecting member. This allows the air stream to effectively cool the exhaust device.

On the other hand, while the air stream does not flow into the engine compartment, such as while the vehicle is at rest, hot air rising from the exhaust device may flow along the rear surface of the engine body, for example, and then may flow into the gap between a member forming the flow redirecting member and the head cover from behind. However, the shield cover extending in the vehicle width direction is disposed behind the flow redirecting member. The shield surface of the shield cover can block the gap described above, and can, in turn, reduce the amount of the hot air flowing into the gap. Moreover, the hot air coming into contact with the shield surface is guided toward the hood in the direction in which the shield surface extends. This allows parts provided on the upper surface of the engine to be protected from the hot air.

In addition, the upper end of the shield cover is designed so as to be located at the same height as that of the rear end of the flow redirecting member or below the rear end of the flow redirecting member. According to this configuration, the air stream that has flowed along the flow redirecting member can arrive at the exhaust device without being blocked by the shield cover.

In this manner, the configuration described above can cool the exhaust device with the air stream produced by the traveling vehicle while protecting the parts provided on the upper surface of the engine.

The flow redirecting member and the shield cover may be both disposed forward of a rear end portion of the head cover.

The shield cover may be spaced apart from the rear end of the flow redirecting member in a longitudinal direction of the vehicle.

According to this configuration, a space between the shield cover and the flow redirecting member can be used as an installation space for parts. Since the installation space is defined behind the flow redirecting member, the air stream guided by the flow redirecting member partially flows into the installation space. According to this configuration, parts arranged between the shield cover and the flow redirecting member can be cooled.

The upper structure may further include: a design cover covering the head cover from above and vertically spaced apart from both of the head cover and the hood that opens and closes the engine compartment. An upper surface of a rear end portion of the design cover may be configured as the flow redirecting member, the shield cover and the head cover may define a recess which is opposite to the design cover with respect to the shield cover and which opens rearward.

The shield cover may have a through hole through which a space defined between the shield cover and the flow redirecting member is allowed to communicate with a bottom portion of the recess. The through hole may be closer to a front end of the vehicle than a rear end portion of the head cover and the shield surface are.

The present inventors' studies on various configurations showed that the configuration described above is effective at cooling the exhaust device with the air stream produced by the traveling vehicle while protecting the parts provided on the upper surface of the engine.

In other words, according to the configuration described above, while the passage of the air stream through the through hole and, in turn, cooling of the exhaust device are accelerated, the hot air can be prevented from flowing through the through hole into the gap.

In particular, arranging the through hole forward of the rear end portion of the head cover and the shield surface is effective at reducing the amount of the hot air flowing through the through hole into the gap.

An upper end portion of the shield cover may be provided with a second flow redirecting member facing upward and extending rearward and downward toward the exhaust device in a longitudinal direction of the vehicle.

According to this configuration, the provision of the second flow redirecting member allows the air stream to be more reliably guided to the exhaust device. This helps cool the exhaust device with the air stream produced by the traveling vehicle while protecting the parts provided on the upper surface of the engine.

As can be seen from the foregoing description, the upper structure of the vehicle engine cools the exhaust device with the air stream produced by the traveling vehicle while protecting the parts provided on the upper surface of the engine.

DETAILED DESCRIPTION

Figure 1:
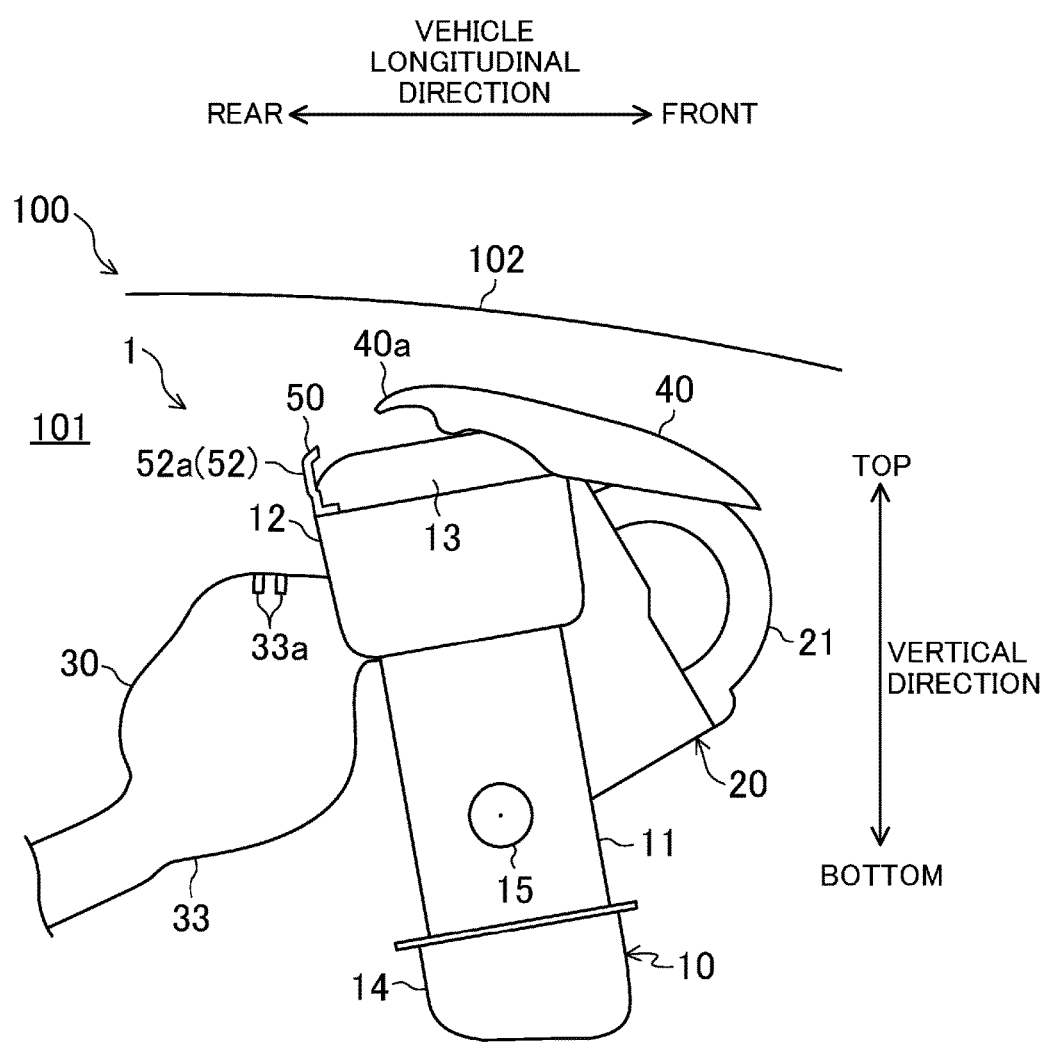
FIG. 1 is a side view illustrating a front portion of a motor vehicle with an engine including a vehicle engine upper structure.
Figure 2:
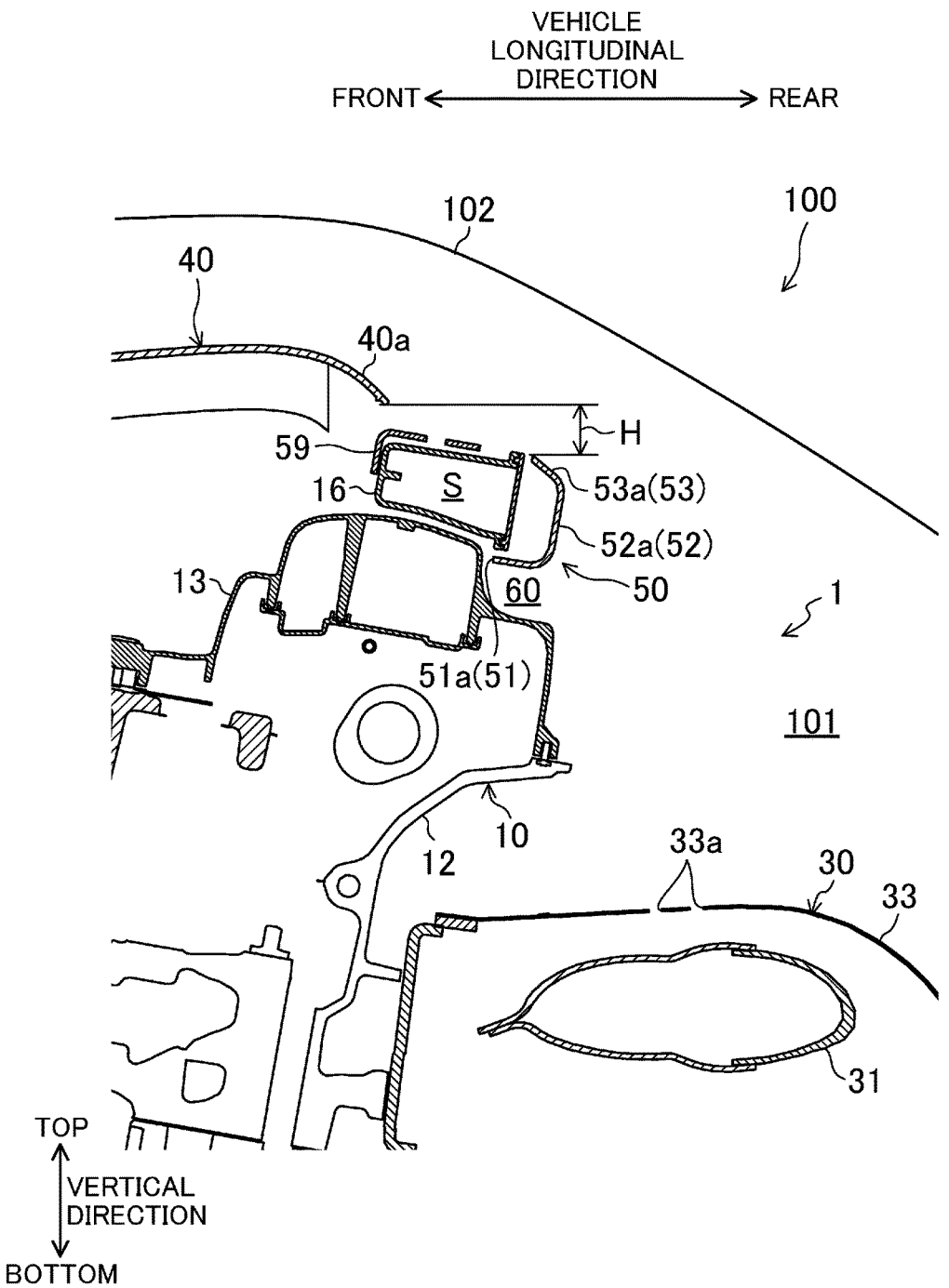
FIG. 2 is a longitudinal cross-sectional view illustrating a rear end portion of the engine.
Figure 3:
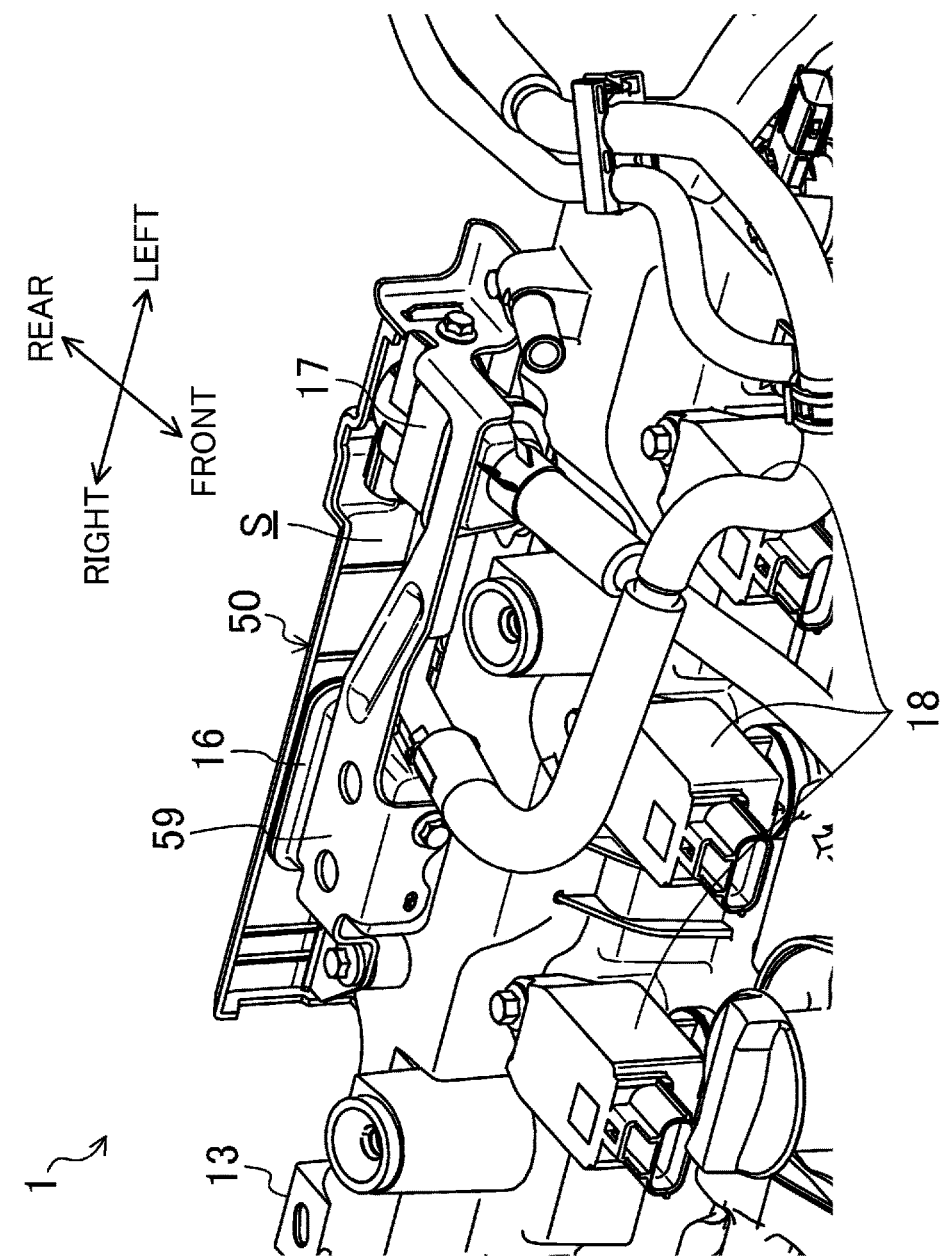
FIG. 3 is a perspective view illustrating the rear end portion of the engine.
Figure 4:
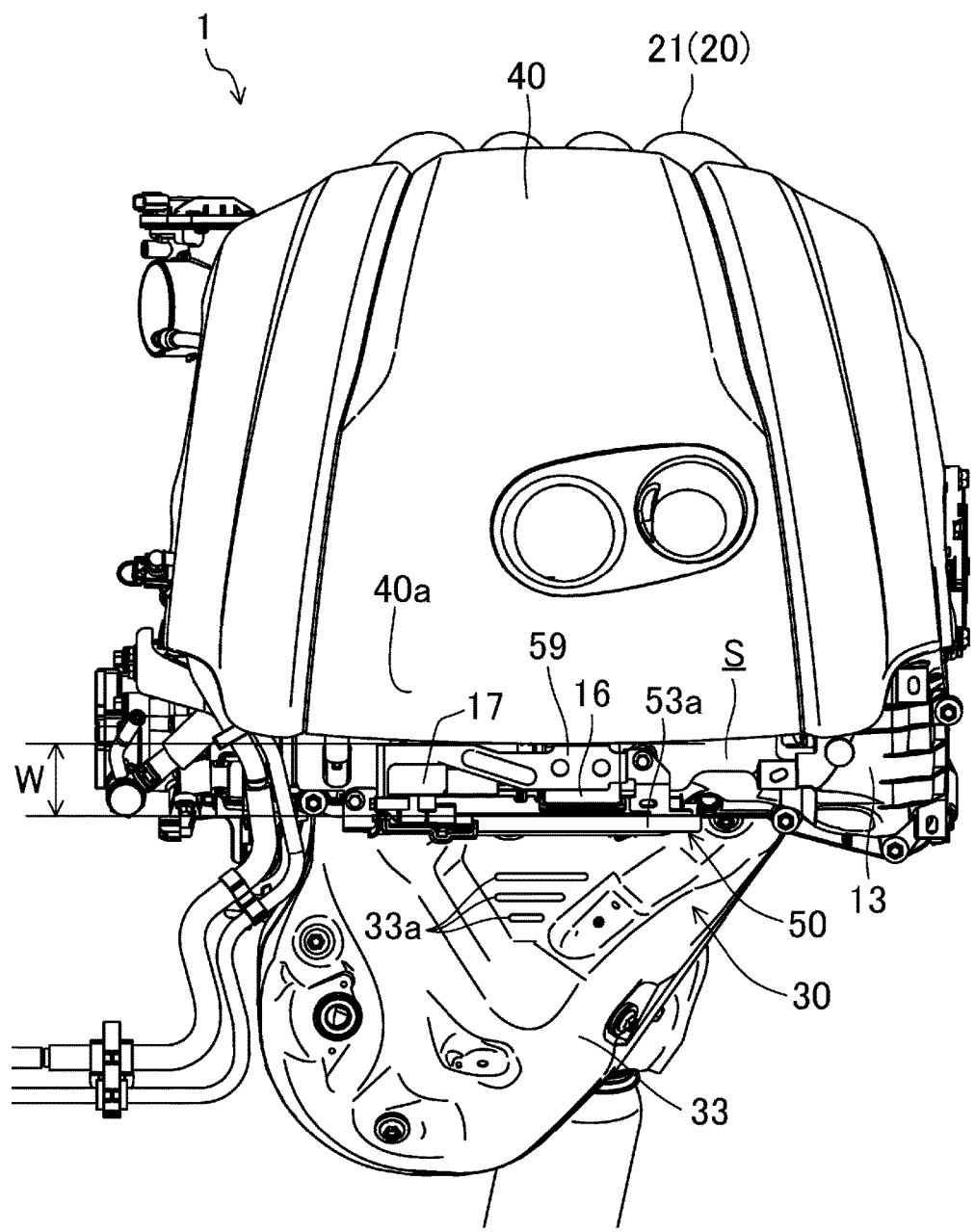
FIG. 4 is a plan view illustrating the engine.
Figure 5:
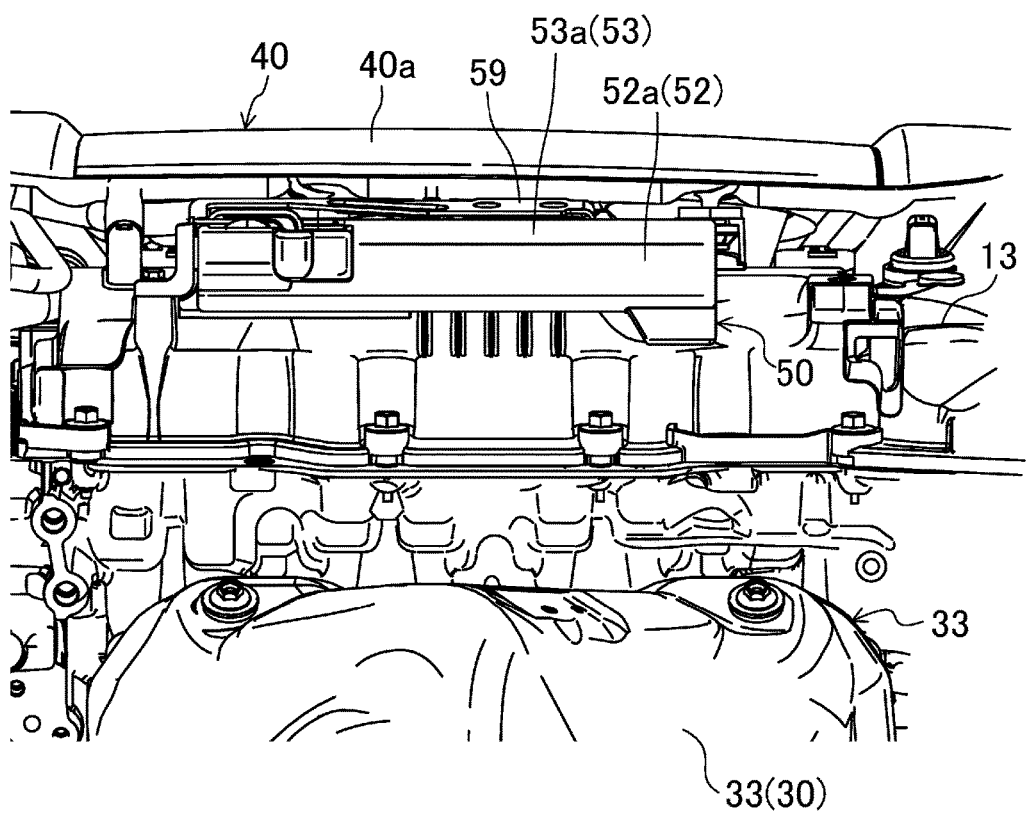
FIG. 5 illustrates the engine as viewed from behind.

An upper structure of a vehicle engine will now be described with reference to the drawings. Note that the following description is illustrative. FIG. 1 is a side view illustrating a front portion of a motor vehicle with an engine including a vehicle engine upper structure according to the present disclosure. FIG. 2 is a longitudinal cross-sectional view illustrating a rear end portion of the engine. FIG. 3 is a perspective view illustrating the rear end portion. Further, FIG. 4 is a plan view of the engine. FIG. 5 illustrates the engine as viewed from behind.

A motor vehicle 100 is configured as a front-engine, front-wheel-drive vehicle. In other words, a drive shaft (not shown) that rotationally drives front wheels and an engine 1 coupled to the drive shaft are adjacent to each other in a front portion of the motor vehicle 100. Thus, the right side of the paper on which FIG. 1 is drawn corresponds to the front side of the motor vehicle 100.

The term "front" in the following description refers to the "front" side of the motor vehicle 100, and corresponds to the right side of the paper on which FIG. 1 is drawn. Likewise, the term "rear" refers to the "rear" side of the motor vehicle 100, and corresponds to the left side of the paper on which FIG. 1 is drawn. The term "left" refers to one side of the motor vehicle 100 in the width direction thereof, and corresponds to the back side of the paper on which FIG. 1 is drawn. The term "right" refers to the other side of the motor vehicle 100 in the width direction thereof, and corresponds to the front side of the paper on which FIG. 1 is drawn. Likewise, in each of the other drawings, the directions corresponding to these terms are referred to as "front," "rear," "left," and "right," respectively.

The engine 1 mounted in the motor vehicle 100 is a multi-cylinder internal combustion engine. Specifically, the engine 1 disclosed herein is an inline-four gasoline engine. However, the engine 1 should not be limited to a gasoline engine. An upper structure indicated below may be used in a so-called diesel engine.

The engine 1 is mounted in an engine compartment 101 defined in a front portion of the motor vehicle 100. That is, the right side of the paper on which FIG. 1 is drawn corresponds to the front side of the motor vehicle 100. On the other hand, the left side of the paper on which FIG. 2 is drawn corresponds to the front side of the motor vehicle 100. The engine compartment 101 is opened and closed with a hood 102 functioning as its roof.

The engine 1 is "transversely" mounted such that the direction in which the four cylinders are arranged substantially coincides with the vehicle width direction, and is configured as a so-called front intake and rear exhaust engine. That is to say, the engine 1 includes an engine body 10 in which a crankshaft (output shaft) 15 is pivotably arranged, an air intake device 20 connected to a front portion of the engine body 10, and an exhaust device 30 connected to a rear portion of the engine body 10. The engine 1 includes a design cover 40 covering an upper portion of the engine 1, and a shield cover 50 standing at the rear end of an upper portion of the engine body 10.

The air intake device 20 allows intake air (fresh air) introduced from outside thereinto to pass therethrough, and supplies the air into the cylinders of the engine body 10. To be specific, the air intake device 20 includes an intake manifold 21 serving as a portion of an intake pipe. The intake manifold 21 is connected to the cylinders through intake ports of the engine body 10.

The engine body 10 is configured to combust, in the cylinders, an air-fuel mixture of fuel and intake air supplied from the air intake device 20. Specifically, the engine body 10 includes an oil pan 14, a cylinder block 11, a cylinder head 12 assembled onto the cylinder block 11 and forming the cylinders together with the cylinder block 11, and a head cover 13 overlaid on the cylinder head 12. The oil pan 14, the cylinder block 11, the cylinder head 12, and the head cover 13 are arranged in this order from bottom to top in a vertical direction. Power generated by combusting the air-fuel mixture is delivered to the outside through the crankshaft 15 pivotably arranged in the cylinder block 11.

FIG. 3 shows a configuration for a region surrounding the head cover 13. Although not shown, the head cover 13 has a rectangular shape elongated in the vehicle width direction. Four spark plugs 18, which are exemplary parts provided on the upper surface of the engine 1, are inserted into a central portion of the head cover 13 in the longitudinal direction of the vehicle while being arranged side by side in the vehicle width direction. FIG. 3 shows only three of the four spark plugs 18. A catch tank 16 and a purge control valve 17 which form a so-called purge system are placed on a rear end portion of the head cover 13. The catch tank 16 and the purge control valve 17 are fixed via a fastener 59 configured as a thin plate.

Figure 12:
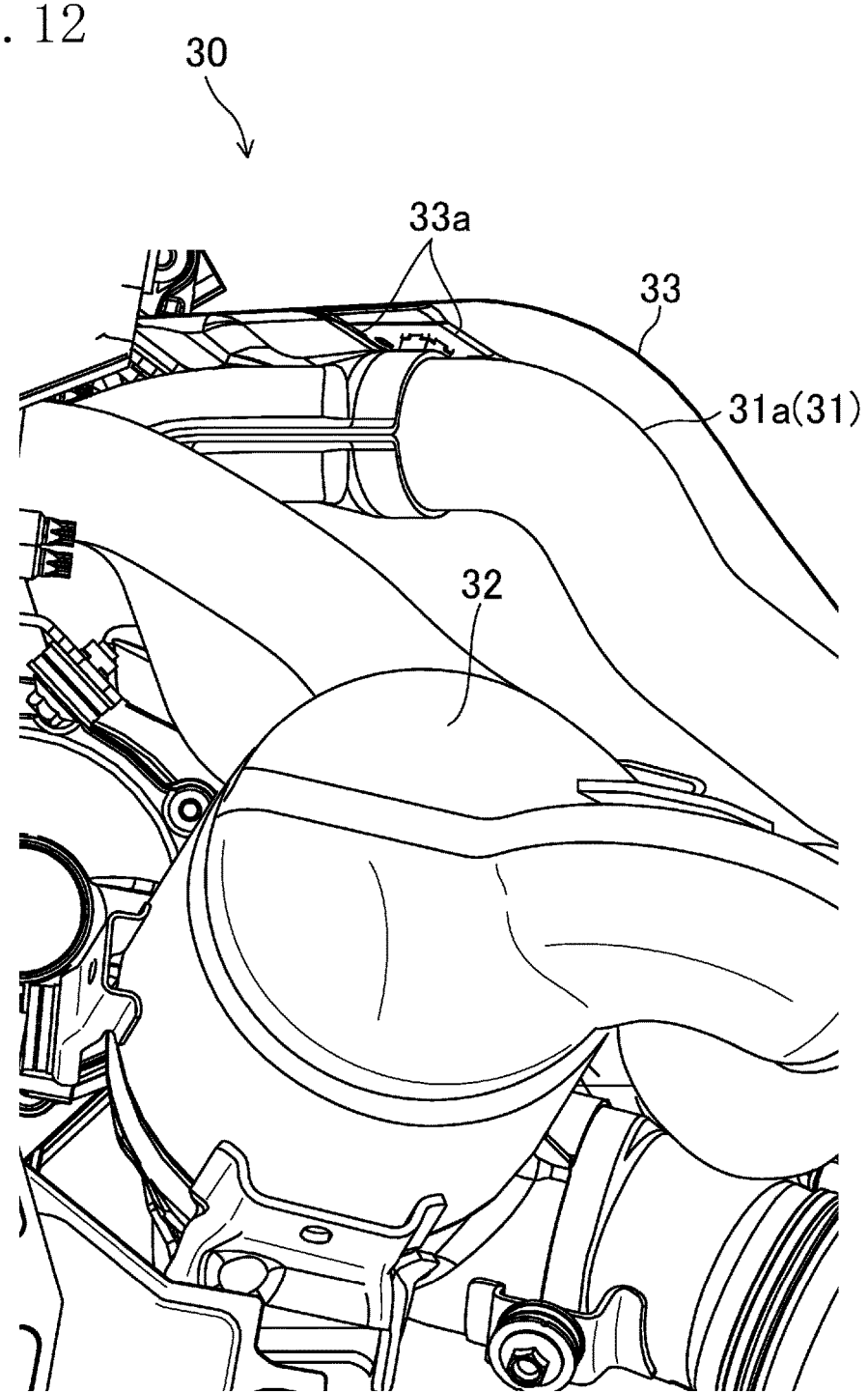
FIG. 12 illustrates an internal configuration for an exhaust device.

FIG. 12 illustrates an internal configuration for the exhaust device 30.

The exhaust device 30 is configured to discharge exhaust produced by combusting the air-fuel mixture to the outside of the engine body 10. Specifically, the exhaust device 30 includes an exhaust pipe 31 (see also FIG. 2) including an exhaust manifold, an exhaust purification catalyst 32 disposed downstream of the exhaust pipe 31, and an insulator 33 housing the exhaust pipe 31 and the exhaust purification catalyst 32. The exhaust manifold is connected to the cylinders through exhaust ports of the engine body 10.

As shown in FIG. 12, the exhaust purification catalyst 32 is disposed below an upstream portion 31a of the exhaust pipe 31 directly connected to the engine body 10.

In this embodiment, the insulator 33 is closer to the rear end of the vehicle than the engine body 10 is, and is located below the upper surface of the head cover 13 as shown in FIG. 2. In addition, the upper surface of the insulator 33 has a plurality of inlets 33a. The inlets 33a extend in the vehicle width direction, and are spaced apart from one another in the longitudinal direction of the vehicle (see FIG. 4). The inlets 33a communicate with a space in the insulator 33. The upstream portion 31a described above is located immediately below the inlets 33a. Thus, air flowing through the inlets 33a into the insulator 33 is blown onto the upstream portion 31a of the exhaust pipe 31.

The design cover 40 is designed to enhance the design of the engine 1. Specifically, as shown in FIGS. 1, 2, and 4 and other figures, the design cover 40 is vertically spaced apart from both of the hood 102 and the head cover 13, and is overlaid on the air intake device 20 and the engine body 10 from above.

More specifically, the design cover 40 is configured as a thin plate elongated in the vehicle width direction as shown in FIG. 4. Although not shown, the design cover 40 is supported by the intake manifold 21 and the head cover 13 from below. While the upper surface of the design cover 40 faces the hood 102, the lower surface of the design cover 40 faces the intake manifold 21 and the head cover 13.

The design cover 40 extends rearward while being curved to gently protrude upward. In this embodiment, a rear end portion of the design cover 40 is located slightly forward of a rear end portion of the head cover 13. Thus, the rear end portion of the head cover 13 is not covered with the design cover 40, so that the catch tank 16 and the purge control valve 17 are exposed when the engine 1 is viewed from above (see FIG. 4).

As shown in FIG. 2, the upper surface of the rear end portion of the design cover 40 forms a first flow redirecting member 40a, which extends downward and rearward from near the hood 102 toward the exhaust device 30 in the longitudinal direction of the vehicle. Specifically, the first flow redirecting member 40a is configured as a surface extending rearward toward an installation space S in which the catch tank 16 and the purge control valve 17 are housed, and the inlets 33a located rearward of the installation space S. Consequently, for example, when an air stream produced by a traveling vehicle and guided into the engine compartment 101 flows along the first flow redirecting member 40a, the air stream is guided toward the installation space S and the inlets 33a (see the arrows F1 and F2 shown in FIG. 9). Note that the first flow redirecting member 40a is an exemplary "flow redirecting member."

Note that as described above, the rear end portion of the design cover 40 is located forward of the rear end portion of the head cover 13. Thus, as shown in, for example, FIG. 4, the first flow redirecting member 40a is also located forward of the rear end portion of the head cover 13.

As shown in FIGS. 1-5, the engine 1 according to this embodiment further includes a shield cover 50 located rearward of the design cover 40 (the first flow redirecting member 40a) and extending in the vehicle width direction. The shield cover 50 stands near the rear end portion of the head cover 13, and is disposed between the rear end portion of the design cover 40 and the rear end portion of the head cover 13 as shown in FIG. 2. As described below, the shield cover 50 is designed to protect various parts from hot air rising from the exhaust device 30 without blocking the air stream directed by the first flow redirecting member 40a (see the arrow F3 shown in FIG. 10). Examples of such hot air include hot air discharged from a space in the insulator 33 through the inlets 33a and hot air discharged from the entire surface of the insulator 33.

The shield cover 50 defines the installation space S described above. Specifically, the shield cover 50 is spaced a distance W apart from the rear end of the design cover 40 in the longitudinal direction of the vehicle as shown in FIG. 4. A gap corresponding to the distance W is formed between the design cover 40 and the shield cover 50 to define the installation space S.

Figure 6:
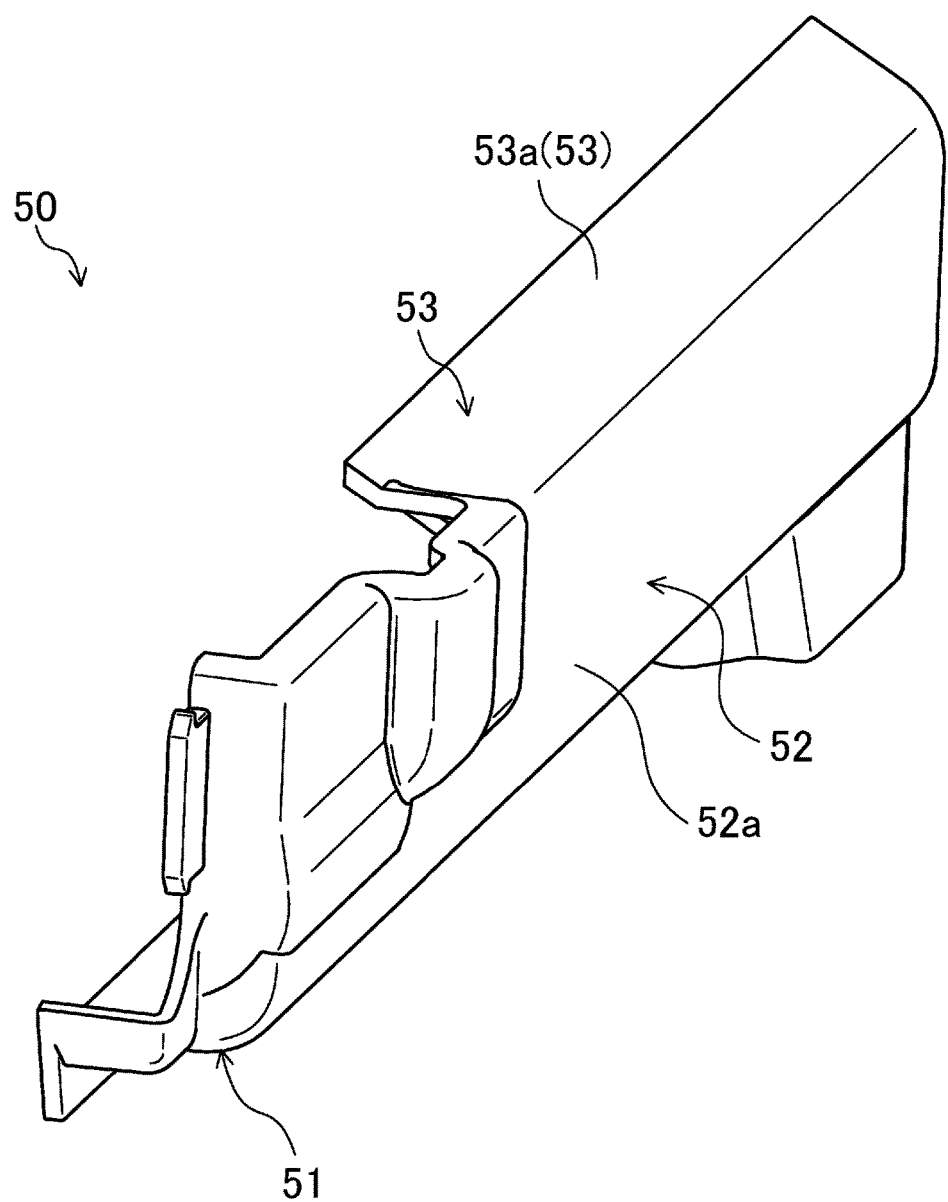
FIG. 6 is a perspective view of a shield cover as viewed obliquely from above.
Figure 7:
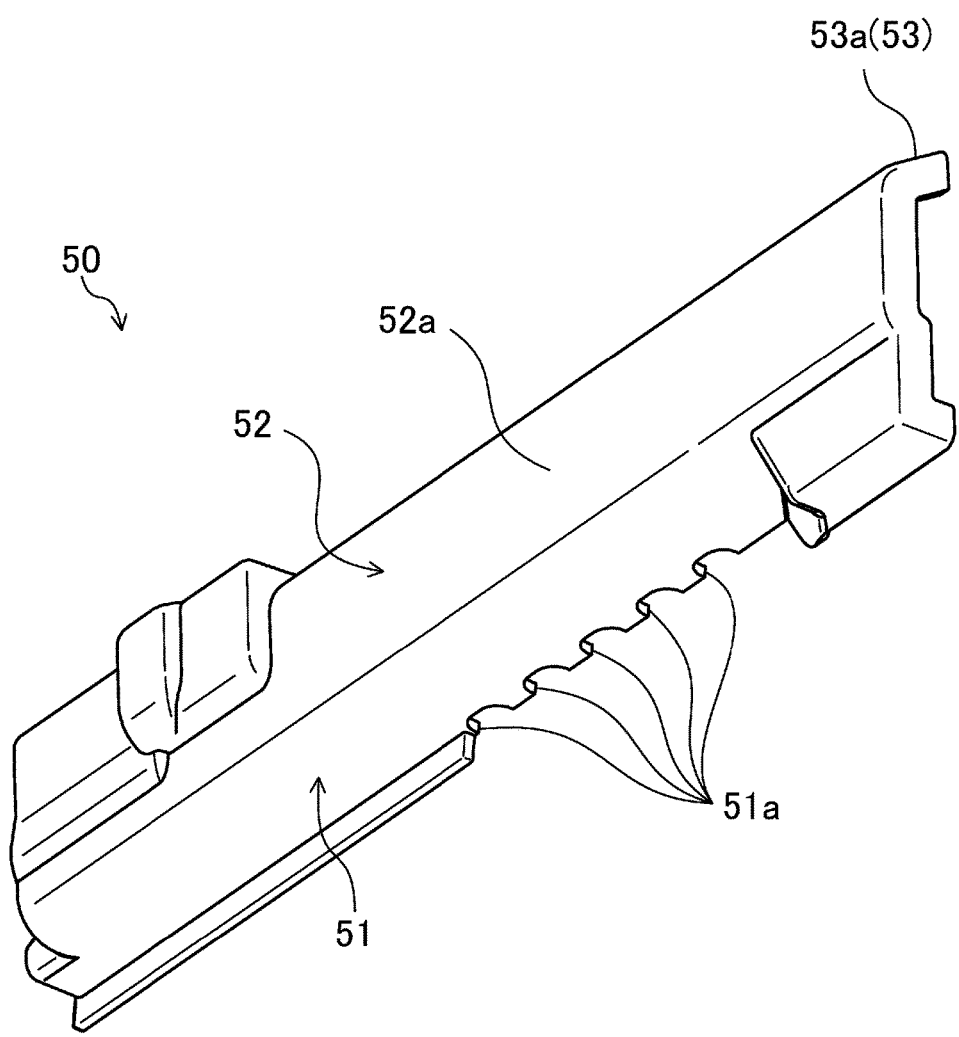
FIG. 7 is a perspective view of the shield cover as viewed obliquely from below.

FIG. 6 illustrates the shield cover 50 as viewed obliquely from above. FIG. 7 illustrates the shield cover 50 as viewed obliquely from below. As shown in FIGS. 6 and 7, the shield cover 50 is a member configured as a thin plate, and is bent to have a U-shaped cross section that opens forward. Specifically, the shield cover 50 includes a horizontal plate portion 51 extending along a substantially horizontal plane, a vertical plate portion 52 extending vertically upward from one side of the horizontal plate portion 51, and an inclined portion 53 extending obliquely upward and forward from the upper end of the vertical plate portion 52.

Each of the portions of the shield cover 50 will now be described.

The horizontal plate portion 51 substantially has a rectangular shape having long sides extending in the vehicle width direction and short sides extending in the longitudinal direction of the vehicle. The horizontal plate portion 51 is attached to the head cover 13 through the fastener 59 described above, although a detailed description thereof is omitted. The horizontal plate portion 51 and the upper end of a rear portion of the head cover 13 define a recess 60 that opens rearward. Specifically, as shown in FIG. 2, the upper end of the rear portion of the head cover 13 is provided with a step having a cross section forming an substantially right angle. This step is covered with the horizontal plate portion 51 from above to define the recess 60 that opens horizontally. As shown in FIG. 2, the recess 60 is opposite to the installation space S with respect to the horizontal plate portion 51, specifically, below the installation space S.

Figure 8:
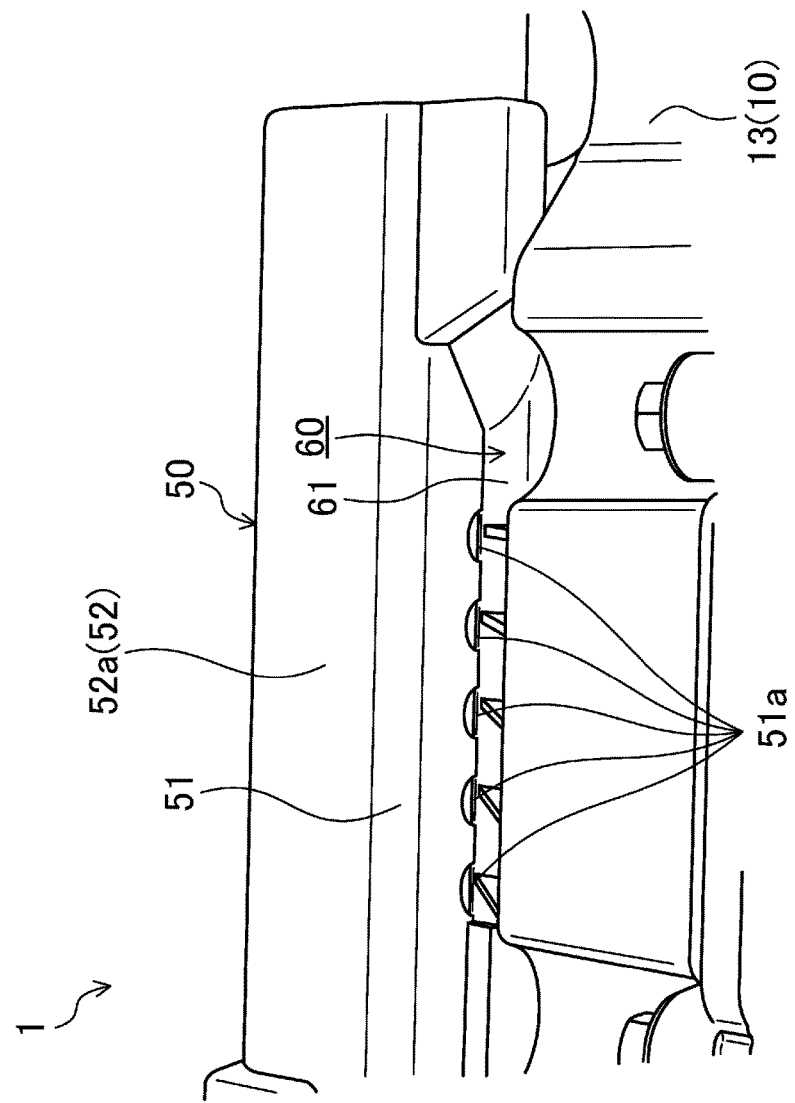
FIG. 8 illustrates the shield cover attached to the engine.

The horizontal plate portion 51 further has a plurality of through holes 51a through which the installation space S and a bottom portion (see FIG. 8) 61 of the recess 60 communicate with each other. Specifically, the through holes 51a are arranged in the vehicle width direction, and are each semicircular, as shown in FIG. 7. This configuration allows the through holes 51a and a wall surface of the head cover 13 to form ventilation holes through which an air stream produced by the traveling vehicle passes, as shown in FIG. 8. The air stream guided to the installation space S blows through the through holes 51a to the bottom portion 61 of the recess 60 (see the arrow F2 shown in FIG. 9).

The through holes 51a are closer to the front end of the vehicle than the rear end portion of the head cover 13 and a shield surface 52a of the vertical plate portion 52 are, as shown in, for example, FIG. 2. Note that only one through hole 51a may be provided. Specifically, the through holes 51a are disposed forward of at least the catch tank 16 and purge control valve 17 described above as viewed in the vehicle width direction.

Meanwhile, the vertical plate portion 52 has a rectangular shape substantially having long sides extending in the vehicle width direction and short sides extending substantially vertically, as shown in FIGS. 2-7. The vertical plate portion 52 has the shield surface 52a facing rearward (directed rearward) and extending upward from near the head cover 13 toward the hood 102 (in this embodiment, vertically upward).

The shield surface 52a forms a rear surface of the vertical plate portion 52, and is designed to shield parts provided on the upper surface of the engine 1 (such as the spark plugs 18, the catch tank 16, and the purge control valve 17) from hot air rising from the exhaust device 30 as described below.

Returning here to the description of the entire shield cover 50, the shield cover 50 is designed such that its upper end is located below the rear end of the first flow redirecting member 40a as indicated by the height H shown in FIG. 2.

As shown in FIGS. 2-7, the inclined portion 53 is formed as a rectangular thin plate portion having long sides extending in the vehicle width direction and short sides extending obliquely upward with respect to a horizontal plane. The inclined portion 53 serving as an upper end portion of the shield cover 50 has a second flow redirecting member 53a facing upward and extending rearward in the longitudinal direction of the vehicle from near the hood 102 toward the exhaust device 30. Specifically, the second flow redirecting member 53a extends substantially parallel to the first flow redirecting member 40a, and extends rearward toward the inlets 33a of the insulator 33 as shown in FIG. 2. Thus, part of the air stream which has flowed along the first flow redirecting member 40a which has passed through a space above the installation space S is guided to the inlets 33a by the second flow redirecting member 53a (see the arrow F1 shown in FIG. 9). Note that the second flow redirecting member 53a is an exemplary "second flow redirecting member."

Figure 9:
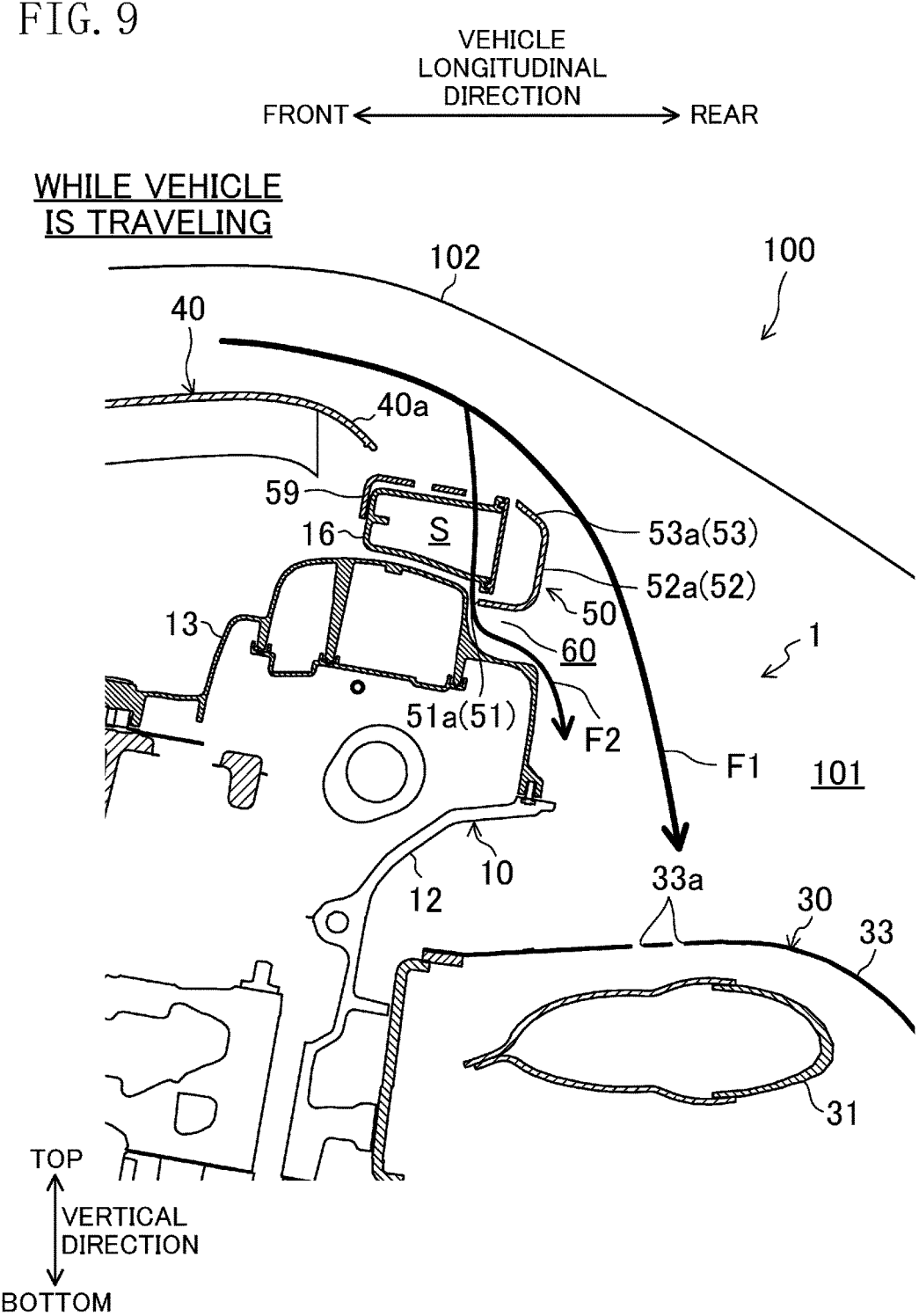
FIG. 9 conceptually shows how an air stream produced by a traveling vehicle flows while the vehicle is traveling.
Figure 10:
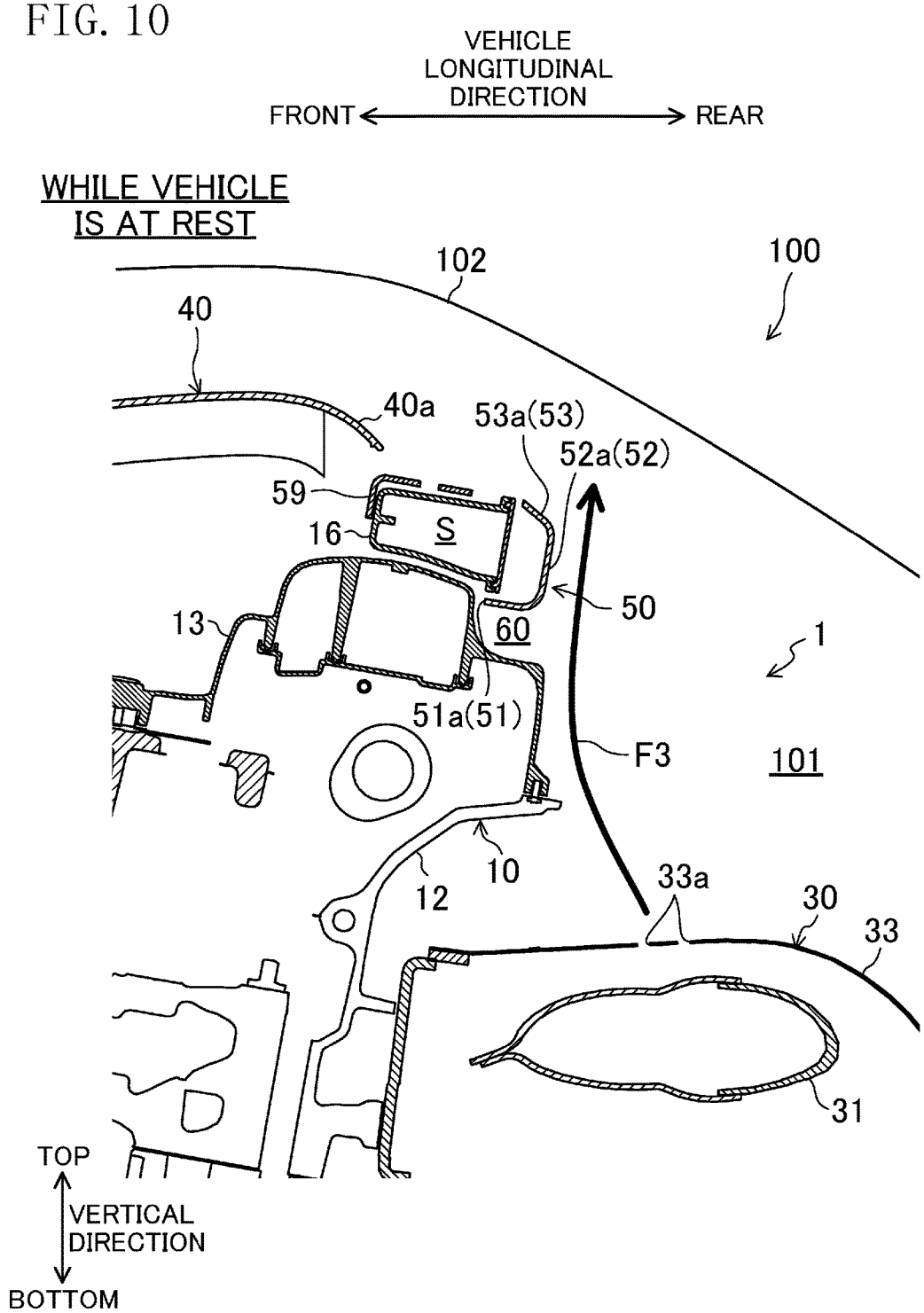
FIG. 10 conceptually shows how hot air flows while the vehicle is at rest.

FIG. 9 conceptually shows how an air stream produced by a traveling vehicle flows while the vehicle is traveling. FIG. 10 conceptually shows how hot air flows while a vehicle is at rest.

According to the configuration described above, for example, while the motor vehicle 100 is traveling, the air stream that has flowed through a front grille into the engine compartment 101 flows through the gap between the design cover 40 and the hood 102, and is guided to the exhaust device 30 by the first flow redirecting member 40a, as indicated by the arrows F1 and F2 shown in FIG. 9. The air stream guided to the exhaust device 30 is blown onto the surface of the insulator 33, and flows through the inlets 33a into the insulator 33. Thus, the exhaust device 30 can be effectively cooled.

Generally, in an engine, the temperature of the exhaust purification catalyst 32 needs to be brought within a predetermined activation temperature range. To address this need by software, it is conceivable to adjust the temperature of an exhaust gas, for example, through control of the air-fuel ratio. Combining such a software countermeasure and the hardware countermeasure described above together especially helps bring the temperature of the exhaust purification catalyst 32 within the activation temperature range and, in turn, maintain the exhaust purification catalyst 32 in a highly active state.

Specifically, the air that has flowed through the inlets 33a into the insulator 33 is blown onto the upstream portion 31a of the exhaust pipe 31 as described above. This configuration can reduce the temperature of an exhaust gas that is yet to pass through the exhaust purification catalyst 32. Thus, the exhaust purification catalyst 32 can be maintained in a highly active state. In addition, since the exhaust purification catalyst 32 is located below the upstream portion 31a, part of the air stream which has cooled the upstream portion 31a is blown also onto the exhaust purification catalyst 32. This helps maintain the exhaust purification catalyst 32 in a highly active state.

In this embodiment, the shield cover 50 having the shield surface 52a is disposed rearward of the design cover 40. This shield surface 52a extends from an upper portion of the head cover 13 toward the hood 102. For this reason, depending on the size of the shield surface 52a, the air stream that has flowed along the first flow redirecting member 40a is blown onto the front surface of the shield cover 50. This may hinder the air stream from being guided to the exhaust device 30, and may, in turn, cause inconvenience in cooling the exhaust device 30. However, the shield cover 50 according to this embodiment is designed such that its upper end is located below the rear end of the first flow redirecting member 40a. According to this configuration, the air stream that has flowed along the first flow redirecting member 40a can be guided to the exhaust device 30 without being blocked by the shield cover 50.

On the other hand, while the air stream does not flow into the engine compartment, such as while the vehicle is at rest, hot air rising from the exhaust device 30 may flow along the rear surface of the engine body 10, for example, and then may flow into the gap between the design cover 40 and the head cover 13 from behind. The hot air flowing into the gap could inconveniently cause parts provided on the upper surface of the engine 1 to erode. However, as described above, the shield cover 50 extending in the vehicle width direction is disposed behind the design cover 40. The shield surface 52a of the shield cover 50 can block the gap between the design cover 40 and the head cover 13, and can, in turn, reduce the amount of the hot air flowing into the gap. Moreover, as indicated by the arrow F3 shown in FIG. 10, the hot air coming into contact with the shield surface 52a is guided toward the hood 102 in the direction in which the shield surface 52a extends. This allows the parts provided on the upper surface of the engine 1 to be protected from the hot air.

The foregoing configuration allows the shield cover 50 to cool the exhaust device 30 with the air stream produced by the traveling vehicle while protecting the parts provided on the upper surface of the engine 1 (such as the spark plugs parts 18, the catch tank 16, and the purge control valve 17).

Moreover, since the installation space S is disposed rearward of the first flow redirecting member 40a, the air stream guided by the first flow redirecting member 40a partially flows into the installation space S. Thus, the parts can be cooled.

The present inventors' studies on various configurations showed that the through holes 51a configured as described above are effective at cooling the exhaust device 30 with the air stream produced by the traveling vehicle while protecting the parts provided on the upper surface of the engine 1.

In other words, while the passage of the air stream through the through holes 51a to the exhaust device 30 and, in turn, cooling of the exhaust device 30 are accelerated, the hot air can be prevented from flowing through the through holes 51a into the gap.

In particular, arranging the through holes 51a forward of the rear end portion of the head cover 13 and the shield surface 52a is effective at reducing the amount of the hot air flowing through the through holes 51a into the gap.

The shield cover 50 including the second flow redirecting member 53a allows the air stream to be more reliably guided to the exhaust device 30. This helps cool the exhaust device 30 with the air stream produced by the traveling vehicle while protecting the parts provided on the upper surface of the engine 1.

OTHER EMBODIMENTS

The configuration of each of the first and second flow redirecting members 40a and 53a should not be limited to the configuration described above. Each of the first and second flow redirecting members 40a and 53a may have, for example, a curved surface gently protruding upward or a flat inclined surface extending toward the exhaust device 30.

In the foregoing embodiment, the upper end of the shield cover 50 is located below the rear end of the first flow redirecting member 40a. However, this configuration is merely an example of the present disclosure. For example, the upper end of the shield cover 50 may be at the same height as that of the rear end of the first flow redirecting member 40a.

In the foregoing embodiment, the design cover 40 and the shield cover 50 are configured as separate parts. However, this configuration is merely an example of the present disclosure. For example, the design cover 40 and the shield cover 50 may be integrated together.

Figure 11:
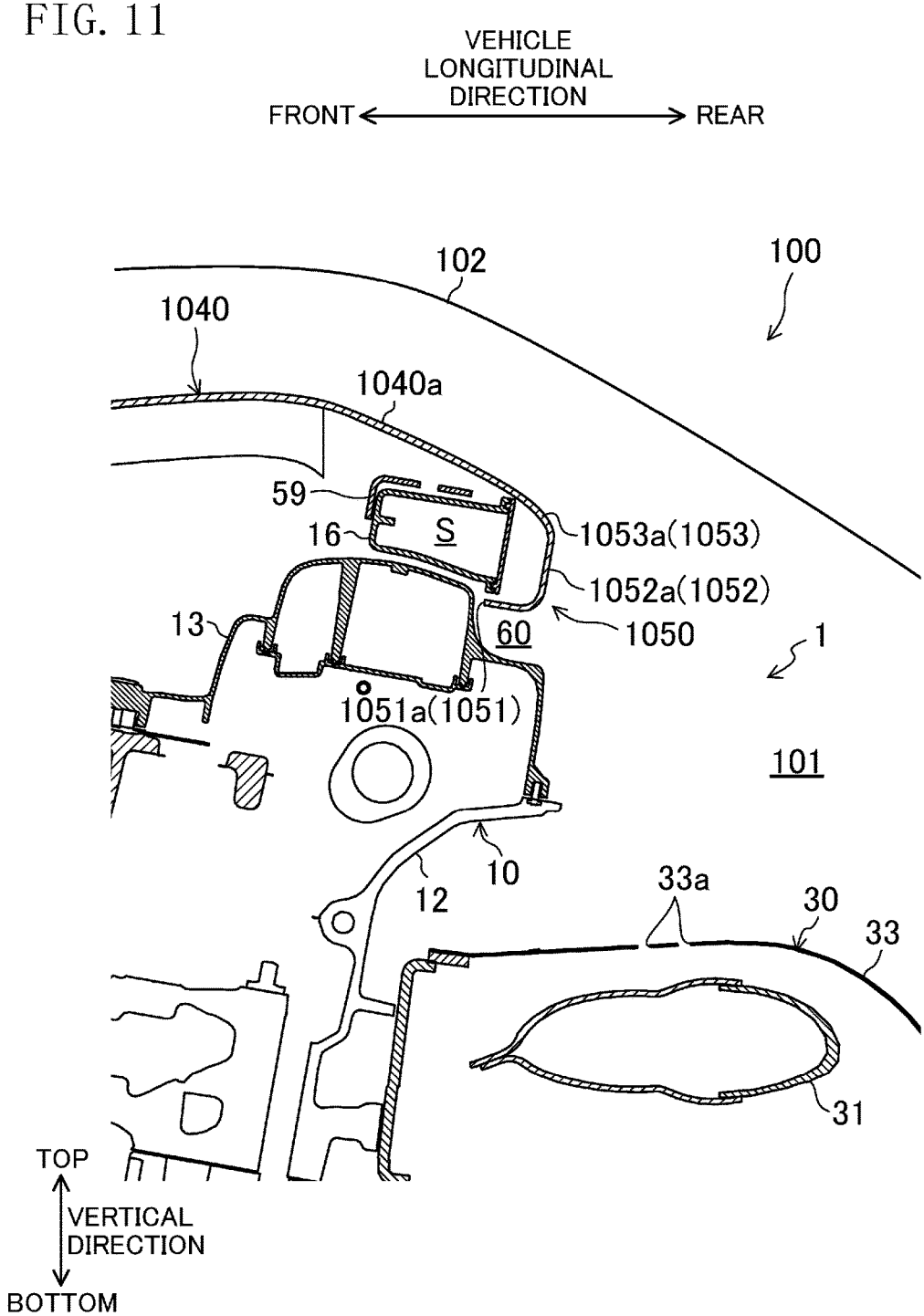
FIG. 11 illustrates a configuration in which a design cover and a shield cover are integrated together, and corresponds to FIG. 2.

FIG. 11 illustrates a configuration in which a design cover and a shield cover are integrated together, and corresponds to FIG. 2. In the example shown in FIG. 11, a design cover 1040 and a shield cover 1050 are integrated together. In this example, a first flow redirecting member 1040a, a second flow redirecting member 1053a, and a shield surface 1052a form a continuous surface.

What is claimed is:

1. An upper structure of a vehicle engine, the vehicle engine including an engine body which is mounted in an engine compartment of a vehicle, and which includes a cylinder block, a cylinder head, and a head cover, and an exhaust device connected to the engine body, being closer to a rear end of the vehicle than the engine body is, and located below the head cover, the upper structure comprising:
a flow redirecting member provided above a rear portion of the head cover, the flow redirecting member extending, below a hood that opens and closes the engine compartment, rearward and downward toward the exhaust device;
a shield cover located rearward of the flow redirecting member and extending in a width direction of the vehicle; and
a design cover covering the head cover from above and vertically spaced apart from both the head cover and the hood that opens and closes the engine compartment, wherein
an upper surface of a rear end portion of the design cover is configured as the flow redirecting member,
the shield cover has a shield surface extending upward from an upper portion of the head cover toward the hood and facing toward the rear end of the vehicle,
the shield cover is designed such that an upper end of the shield cover is located at the same height as that of a rear end of the flow redirecting member or below the rear end of the flow redirecting member,
the flow redirecting member is vertically spaced apart from both the hood and the head cover, and
an upper surface of the flow redirecting member is spaced apart from, and faces, a lower surface of the hood.

2. The upper structure of claim 1, wherein
the flow redirecting member and the shield cover are both disposed forward of a rear end portion of the head cover.

3. The upper structure of claim 1, wherein
the shield cover is spaced apart from the rear end of the flow redirecting member in a longitudinal direction of the vehicle.

4. The upper structure of claim 3, wherein
the shield cover and the head cover define a recess which is opposite to the design cover with respect to the shield cover and which opens rearward,
the shield cover has a through hole, so that a front of the shield cover and a bottom part of the recess communicate with each other through the through hole, and
the through hole is closer to a front end of the vehicle than a rear end portion of the head cover and the shield surface are.

5. The upper structure of claim 1, wherein
an upper end portion of the shield cover is provided with a second flow redirecting member facing upward and extending rearward and downward toward the exhaust device in a longitudinal direction of the vehicle.

6. The upper structure of claim 1, wherein
a clearance is provided between a front end of the design cover and the hood.

* * * * *